Aug. 23, 1949.  D. D. McDERMOTT  2,479,758
TRAILER CRANE FOR LOADING TRUCKS
Filed May 13, 1947   3 Sheets-Sheet 1

INVENTOR
D. D. McDermott
BY
ATTORNEYS

Aug. 23, 1949.  D. D. McDERMOTT  2,479,758
TRAILER CRANE FOR LOADING TRUCKS
Filed May 13, 1947  3 Sheets-Sheet 3
Fig. 3
Fig. 4
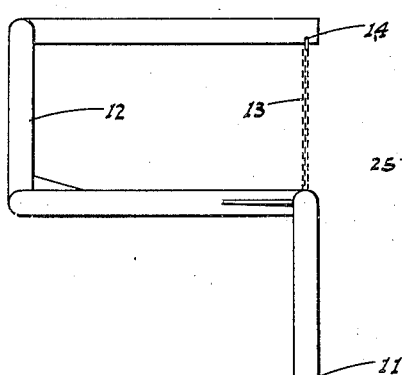
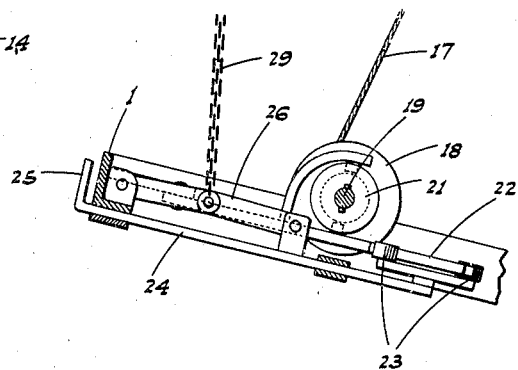
Fig. 5
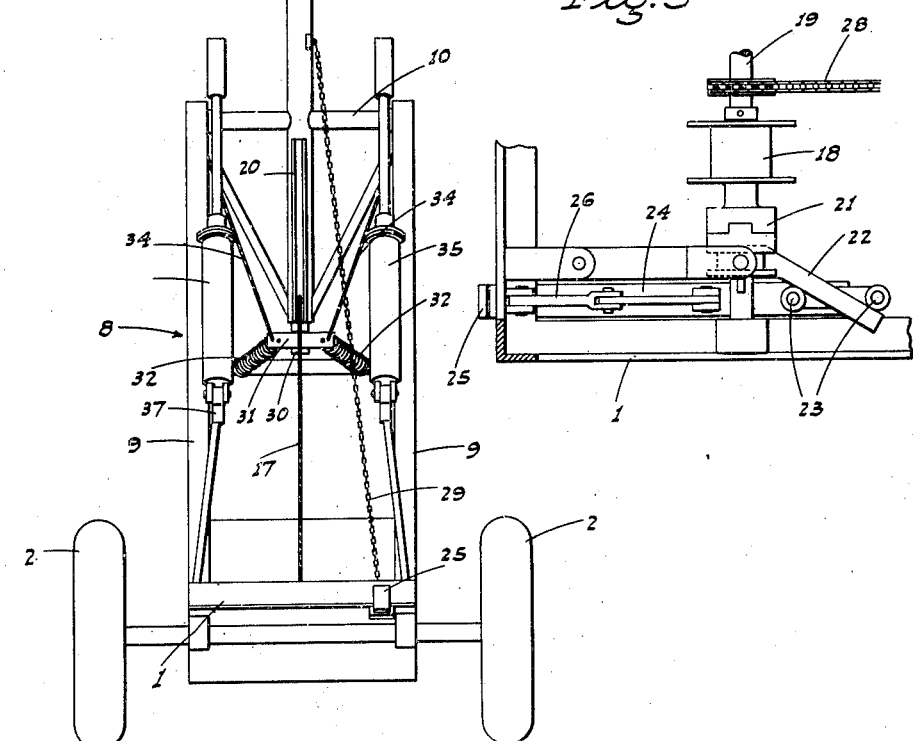
INVENTOR
D. D. McDermott
BY
*Corbett T Corbett*
ATTORNEYS Patented Aug. 23, 1949

2,479,758

UNITED STATES PATENT OFFICE 2,479,758

TRAILER CRANE FOR LOADING TRUCKS

Darwin D. McDermott, San Jose, Calif.

Application May 13, 1947, Serial No. 747,666

11 Claims. (Cl. 214—77)

1

This invention relates to, and it is an object to provide a novel, trailer crane for loading trucks, particularly garbage wagons or the like.

A further object of the invention is to provide a trailer crane which is especially useful in handling bundled garbage; it being common practice for garbage collectors to bundle waste paper etc. in a burlap sheet prior to loading on the truck.

Another object of the invention is to provide a trailer crane which comprises a wheel-type trailer adapted to hitch to the truck at the rear, and a power actuated boom assembly adapted to swing a load from the ground at a point to the rear of the trailer upwardly and forwardly to discharge said load onto the truck.

An additional object of this invention is to provide a tractor crane, as above, wherein the boom is actuated in a loading direction by a gas engine; there being means to automatically release the load over the truck, to disconnect the engine, and to return the boom to starting position without attendance by the operator, whose only task therefore is initially connecting the engine in operating relation to said boom after the bundle is attached to the same.

A further object of the invention is to provide a practical and convenient trailer-crane for loading trucks, and one which will be exceedingly effective for the purpose for which it is designed.

These objects are accomplished by means of such structure and relative arrangement of parts as will fully appear by a perusal of the following specification and claims.

In the drawings:

Fig. 3 is a rear end elevation of the trailer crane showing the parts in the position of Fig. 2.

Fig. 4 is an enlarged fragmentary sectional elevation of the cable drum and control clutch assembly.

Fig. 5 is an enlarged fragmentary plan view of said cable drum and control clutch assembly.

Figure 1:
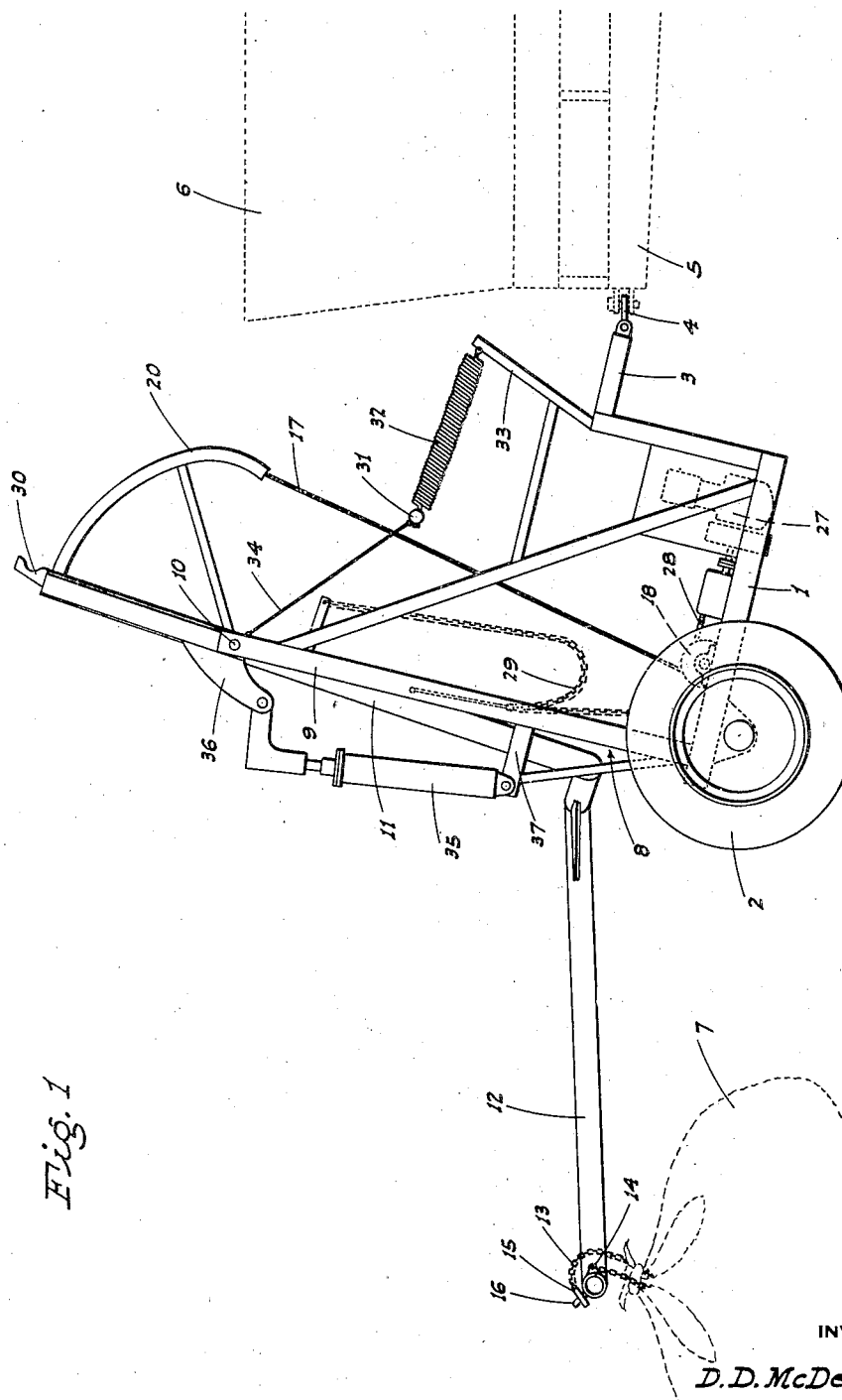
Fig. 1 is a side elevation of the trailer crane with the parts in starting or loading position.

Referring now more particularly to the characters of reference on the drawings, the trailer crane comprises a rigid frame 1 provided, at the rear, with a transversely spaced pair of supporting wheels 2; there being a tongue 3 projecting from the front of said frame 1 for connection by a hitch 4 with a rear end of a truck 5 which includes a body 6.

2

The crane is adapted to pick up a load, such as a bundle 7 of garbage or the like, from a point to the rear of the trailer, and to swing said load forwardly and upwardly to discharge into the truck body 6. The mechanism employed to accomplish this result comprises the following:

An upstanding frame, indicated generally at 8, is fixed on the trailer frame 1 adjacent its rear end, and includes upstanding side beams 9 suitably connected together and braced to rigidify the same.

A cross shaft 10 is journaled in connection with, and extends between, the upper ends of the side beams 9, and a rotary boom 11 is fixed, intermediate its ends, to the cross shaft 10 in radial relation.

The rotary boom 11 is normally inverted, i. e. with the head end thereof lowermost, as in Fig. 1, and at such head end the boom is fitted with a laterally opening, generally U-shaped load suspension frame 12; the latter being disposed with its outer free end in substantially the same longitudinal vertical plane as the boom 11.

The load suspension frame 12 is normally disposed in substantially horizontal, rearwardly projecting relation adjacent the ground, as in Fig. 1, for ready manual access and the attachment of the load thereto.

The load, as for example a bundle 7 formed from a burlap sheet knotted together at the top, is attached to the load suspension frame 12 by means of a chain 13 at the outer free end of said frame. The chain 13 is fixed to said outer free end of the frame 12, as at 14, thence is slipped through the knot of the bundle 7, and at its other end said chain is fitted with an eye 15 which releasably engages over a normally upstanding pin 16 adjacent the point of chain connection 14.

By means of a power assembly, hereinafter described, the normally inverted rotary boom 11 is swung from the starting position of Fig. 1 upwardly until the head end of said boom is elevated, as in Fig. 2, with the load suspension frame 12 projecting at a forward and upward incline over the truck body 6. During this course of swinging or motion of the boom, the bundle 7, depending from the load suspension frame 12, swings through the latter.

As the rotary boom 11 reaches its upright position, with the load suspension frame inclined upwardly and forwardly, as in Fig. 2, over the body 6 of the truck, the eye 15 automatically escapes the pin 16, which is then projecting downwardly below horizontal. When this occurs the bundle 7 automatically slips away from the chain 13 and falls by gravity into the body 6.

The rotary boom is swung between its starting and discharge positions by means of a cable 17 leading from a cable drum 18 on a driven cross shaft 19 carried in the trailer frame 1 ahead of the upstanding frame 8. From the cable drum 18 the cable 19 extends upwardly, in front of the upstanding frame 8, and passes about an arcuate cable guide 20 on, and projecting forwardly from, the normally upper end portion of the rotary boom 11.

A clutch unit 21 is interposed between the driven cross shaft 19 and the drum 18, such clutch unit 21 including a clutch control arm 22 extending diagonally between actuating rollers 23 on a clutch control slide 24 having an operating handle 25 at one end thereof. An articulated link unit 26 is also connected between the slide 24 and a fixed point on the frame.

When the slide 24 is slid in a direction, by the handle 25, to straighten out the articulated link unit 26, the clutch unit 21 is engaged, whereby the drum 18 is rotated from the cross shaft 19. The cross shaft 19 is driven from an engine 27 by means of an endless chain and sprocket unit 28.

Figure 2:
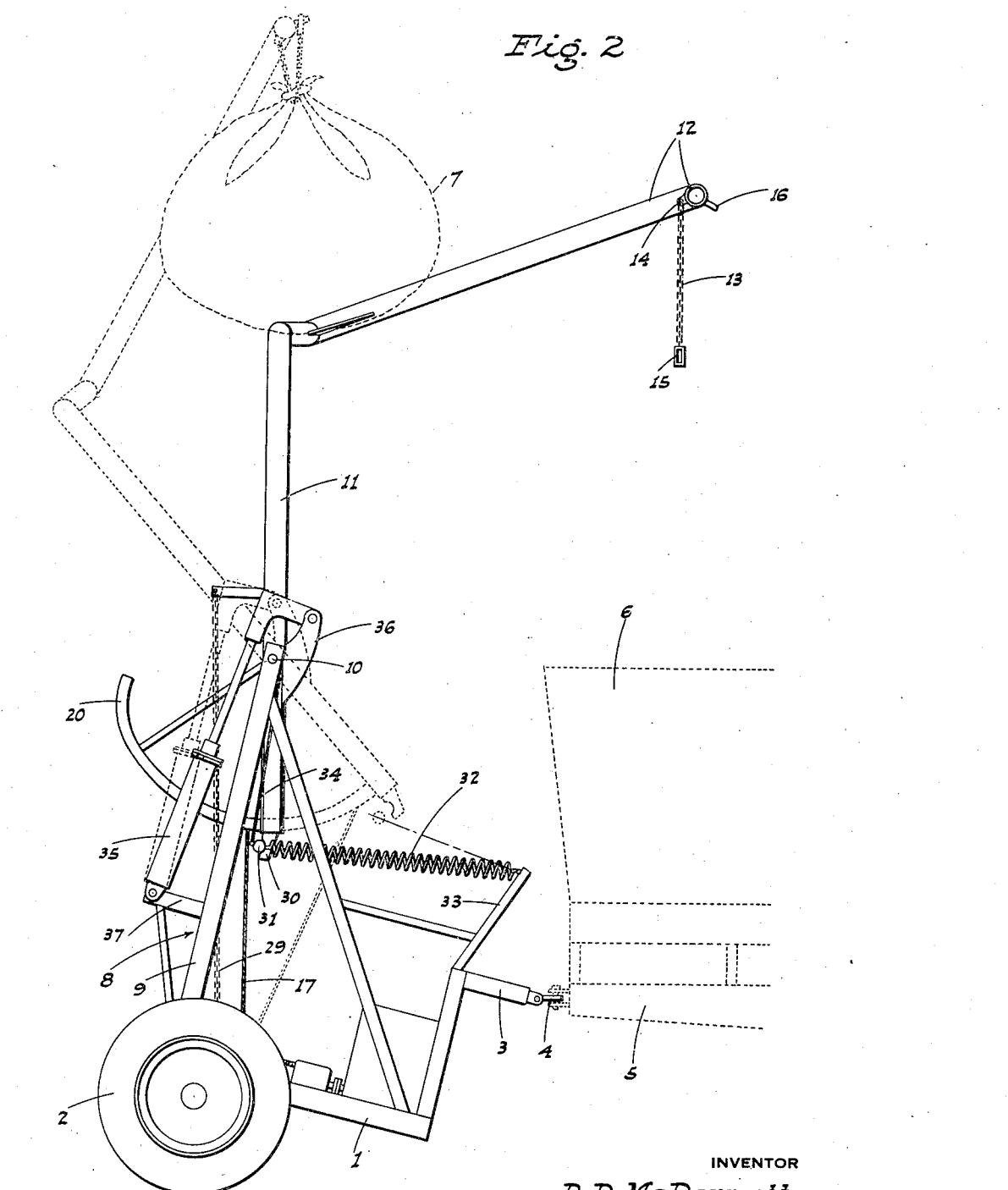
Fig. 2 is a similar view, but shows the parts in full lines at load releasing position, and in dotted lines at an intermediate position.

With rotation of the drum 18 the cable 17 winds thereon and the rotary boom 11 is swung between its starting position of Fig. 1 and its discharge position of Fig. 2.

As said boom reaches its discharge position, a chain 29, connected between said rotary boom 11 and the articulated link unit 26, tightens and pulls upwardly on said unit, shifting the clutch control slide 24 in a direction to disengage the clutch unit 21. Thus, the power means is automatically disconnected as the rotary boom reaches its discharge or dumping position. After this occurs the said rotary boom is returned to its normal starting or loading position, as follows:

As the boom approaches, but short of, its discharge position, a hook 30 on the normally upper end of said boom engages a cross bar 31 connected between a pair of forwardly projecting tension springs 32 anchored at their front ends to upstanding posts 33 on the trailer frame 1; said cross bar 31 being flexibly suspended by cords 34 which lead to the side beams 9.

With continued swinging of the rotary boom 11 towards its discharge position, with the hook 30 then moving rearwardly, the springs 32 are loaded in the manner shown in Fig. 2. Thus, when the bundle or load 7 discharges into the body 6 of the truck, and the chain 29 tightens and releases the clutch unit 21, the loaded springs 32 act on the rotary boom 11 to swing it rearwardly beyond dead-center and start it on its downward swinging movement to its initial or starting position, as in Fig. 3.

In order to prevent too rapid lowering of the rotary boom on its return path of motion, there is provided a pair of hydraulic shock absorbers 35 suitably connected between arms 36 on the cross shaft 10 and brackets 37 on the side beams 9. These hydraulic shock absorbers 35 permit the rotary boom, together with the load suspension frame 12, to return to its starting position easily and smoothly.

From the above, it will be evident that once the operator has suspended a load 7 from the suspension frame 12, and shifted the clutch control slide 24 in a direction to engage the clutch unit 21, that the crane is thereafter automatically operative to swing the load to a position over the body 6; to discharge such load; to disengage the clutch unit 21; and to return the rotary boom to its starting position.

While the trailer crane has been described primarily for use in loading garbage wagons, it obviously may be put to other uses to which it may be suited.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A truck loading crane comprising a main frame adapted to connect to the truck, an upstanding frame fixed on the main frame, a rotary boom mounted on the upstanding frame for swinging motion from a loading position with one end adjacent the ground to a discharge position with said one end over the truck, and power means operative to swing the boom between loading and discharge positions; a flexible element connected at one end to the boom, a pin on the boom, and an eye on the other end of the flexible element adapted to releasably engage the pin, said pin projecting upwardly when the boom is in loading position, and projecting downwardly when the boom is in discharging position.

2. A truck loading crane comprising a main frame adapted to connect to the truck, an upstanding frame fixed on the main frame, a rotary boom mounted on the upstanding frame for swinging motion from a loading position with one end adjacent the ground to a discharge position with said one end over the truck, and power means operative to swing the boom between loading and discharge positions; there being a load suspension frame on the normally lower end of the boom projecting outwardly above the ground, said suspension frame being of generally U-shape and opening laterally, and means on the free end of said suspension frame to attach a load.

3. A truck loading crane comprising a main frame adapted to connect to the truck, an upstanding frame fixed on the main frame, a rotary boom mounted on the upstanding frame for swinging motion from a loading position with one end adjacent the ground to a discharge position with said one end over the truck, and power means operative to swing the boom between loading and discharge positions; there being a load suspension frame on the normally lower end of the boom projecting outwardly above the ground, said suspension frame being of generally U-shape and opening laterally, and means on the free end of said suspension frame to attach a load, the free end of said suspension frame being in substantially the same vertical plane as the plane of swinging of said boom.

4. A trailer crane comprising a wheel supported trailer adapted to be hitched to, and to trail behind, a load carrying truck, an upstanding frame on the trailer, a normally inverted boom pivoted intermediate its ends on the upstanding frame for swinging from a loading position with the head end lowermost and adjacent the ground, to a discharge position with said head end raised over the truck, means to releasably secure a load to said head end of the boom, and power means operative to swing the boom between loading and discharge positions; said power means including a clutch driven cable drum on the trailer, and a cable leading from the drum to the normally upper end portion of the boom, there being a cable guide quadrant on said portion of the boom projecting forwardly and the cable engaging said quadrant.

5. A trailer crane comprising a wheel supported trailer adapted to be hitched to, and to trail behind, a load carrying truck, an upstanding frame on the trailer, a normally inverted boom pivoted intermediate its ends on the upstanding frame for swinging from a loading position with the head end lowermost and adjacent the ground, to a discharge position with said head end raised over the truck, means to releasably secure a load to said head end of the boom, power means operative to swing the boom between loading and discharge positions, and spring means loaded upon swinging of the boom between loading and discharge positions operative to cause swinging of the boom from the discharge toward the loading position; the power means including a clutch unit, hand means to engage the clutch unit, and boom actuated means to disengage the clutch unit as the boom reaches substantially discharge position.

6. A crane, as in claim 5, in which said spring means includes a pair of transversely spaced tension springs anchored at one end and having a cross member between their opposite ends; there being a hook on the boom positioned to engage the cross member and load said springs as the boom swings toward discharge position.

7. A trailer crane comprising a wheel supported trailer adapted to be hitched to, and to trail behind, a load carrying truck, an upstanding frame on the trailer, a normally inverted boom pivoted intermediate its ends on the upstanding frame for swinging from a loading position with the head end lowermost and adjacent the ground, to a discharge position with said head end raised over the truck, means to releasably secure a load to said head end of the boom, power means operative to swing the boom between loading and discharge positions, and spring means loaded upon swinging of the boom between loading and discharge positions operative to cause swinging of the boom from the discharge toward the loading position; the power means including a clutch unit, hand means to engage the clutch unit, and boom actuated means to disengage the clutch unit as the boom reaches substantially discharge position, there being shock absorbing means arranged to yieldably check swinging of the boom between discharge and loading position.

8. A trailer crane comprising a wheel supported trailer, means to attach the trailer to a load carrying vehicle, an upstanding frame on the trailer, a normally inverted boom pivoted intermediate its ends to the trailer, a load suspension frame on the lower end of the boom, said frame normally projecting outwardly from the boom in a substantially horizontal position whereby when the boom is turned on its axis through an arc of substantially 180 degrees the load suspension frame will then extend substantially horizontally out from the lifted end of the boom and overhang the body of the vehicle, and means to swing the boom on its pivotal connection with the frame.

9. A structure as in claim 8 including a pin on the outer end of the load suspension frame which projects upwardly from the suspension frame when in its lower position, a flexible member fixed to the frame and an eye on the flexible member adapted to fit loosely over the pin.

10. A trailer crane comprising a wheel supported trailer, means to attach the trailer to a load carrying vehicle, an upstanding frame on the trailer, a boom, a shaft fixed to the boom intermediate its ends, such shaft being journaled in the frame adjacent its upper end, a load suspension frame on the lower end of the boom, means to detachably suspend a load on the load suspension frame, means to rotate the boom to carry the suspension frame to a point overhanging the load carrying vehicle, a normally downwardly and rearwardly projecting arm on the shaft, a hydraulic shock absorber mounted on the upstanding frame to the rear thereof, the operating rod of the shock absorber being pivoted to said arm on the shaft.

11. A trailer crane comprising a wheel supported trailer, means to connect the trailer to a load carrying vehicle, an upstanding frame on the trailer, a boom pivoted intermediate its ends to the frame, a load suspension means on the lower end of the boom, a power unit on the frame, a driving shaft connected in driving relation with the power unit, a driven shaft, a cable drum on the driven shaft, a lift cable connected between the drum and boom and operative to swing the boom on its pivot to carry the load suspension means from its lower position to a position overhanging the vehicle, a clutch unit between the shafts for connecting and disconnecting them in relative driving relation, a hand operated slide on the trailer, means connected with the slide and effective to engage the clutch parts when the slide is moved in one direction and to disengage the clutch parts when the slide is moved in the other direction, an articulated link connecting between the slide and frame and adapted to straighten out when the slide is moved to clutch engaging position, and a cable connected between the link and boom and effective to break the articulated link and hence move the slide to de-clutching position when the boom is swung to carry the load suspension means from its lowermost position to its position overhanging the vehicle.

DARWIN D. McDERMOTT.

REFERENCES CITED

The following references are of record in the file of this patent:

UNITED STATES PATENTS

| Number | Name | Date |
| --- | --- | --- |
| 852,919 | Whittemore | May 7, 1907 |
| 1,052,096 | Schulze | Feb. 4, 1913 |
| 1,282,300 | Senior | Oct. 22, 1918 |
| 2,033,243 | Jester | Mar. 10, 1936 |
| 2,234,599 | Johnston | Mar. 11, 1941 |
| 2,390,268 | Penney | Dec. 4, 1945 |
| 2,426,889 | Le Tourneau | Sept. 2, 1947 |

FOREIGN PATENTS

| Number | Country | Date |
| --- | --- | --- |
| 25,932/30 | Australia | Oct. 20, 1930 |